Patented Sept. 19, 1950

2,522,669

UNITED STATES PATENT OFFICE 2,522,669

SYNTHETIC LUBRICANTS FROM NORMAL ALIPHATIC MERCAPTANS AND ALIPHATIC KETONES

Frederick C. Frank, Ardmore, Pa., assignor to Socony-Vacuum Oil Company, Incorporated, a corporation of New York No Drawing. Application May 21, 1947, Serial No. 749,596

12 Claims. (Cl. 260—609)

This invention relates primarily to a reaction product of normal octyl mercaptan and oleone and to a method of lubricating bearing surfaces by the use thereof.

United States Letters Patent 2,322,093, granted to Robert C. Moran et al., describes the use of minor amounts of mercaptols and mercaptals in lubricating oils as oxidation inhibitors. No known publication or patent describes the particular reaction products of this invention, nor the use of any reaction product of even the same general class as a lubricant.

According to this invention it has been discovered that normal octyl mercaptan can be reacted with oleone in the presence of anhydrous zinc chloride and gaseous hydrochloric acid at a temperature of around 150–180° C., and that this reaction will result in the production of a material that is particularly useful as a synthetic lubricant, either alone, or when blended with other lubricants or improving agents.

While normal octyl mercaptan and oleone (diheptadecenyl ketone) are the preferred reactants, some latitude is possible in the choice of reactants. For example, any normal mercaptan from normal hexyl mercaptan to normal tetradecyl mercaptan may be utilized in place of normal octyl mercaptan and even the presence of short side chains in the alkyl radical of the mercaptan will not prevent the formation of a good synthetic lubricant. However, the mercaptan should be a primary mercaptan. As the length of the alkyl radical increases, so generally does the pour point and the viscosity index of the product.

The oleone may be replaced by another ketone in which the aliphatic radicals contain an average of not less than about 14 nor more than about 20 carbon atoms. Ketones containing aliphatic radicals of less than about 14 carbon atoms may be used, provided that the length of the aliphatic radical in the mercaptan is lengthened. These aliphatic radicals may either be saturated or unsaturated, and also may contain short alkyl side chains.

The catalyst is preferably a combination of anhydrous zinc chloride and gaseous hydrochloric acid. Other similarly acting metal halide and halogen acids may be substituted.

The reaction is preferably accomplished within a temperature range of 150–180° C. Within this temperature range the reaction is substantially complete within one to three hours.

The reactants apparently react in the ratio of one mol of oleone to two mols of normal octyl mercaptan and the presence of an excess of normal octyl mercaptan does not apparently cause the addition of any further quantity of mercaptan to the reaction product. Preferably, an amount of anhydrous zinc chloride is used which is the equivalent to about 10%, or at least between 5 and 20%, by weight of the total amount of the reactants present and an excess of hydrochloric acid is maintained in the reaction mixture throughout the reaction period.

It is preferred to conduct the reaction in apparatus equipped with means to collect any water formed during the reaction, and the water recovered by this equipment is approximately one mol of water for each mol of oleone used.

At the end of the reaction period, water may be added carefully to hydrolyze the reaction mass, the reaction mixture refluxed at 100–105° C. for an hour or two to complete the hydrolysis and thereafter diluted with toluene to aid in filtration and washing. The diluted reaction mixture may then be filtered through a layer of filter clay and washed several times with hot distilled water. The water may thereafter be separated from the mixture and the mixture again filtered and thereafter topped at 5–6 mm. mercury of pressure at around 200° C. to remove any unreacted normal octyl mercaptan.

The resultant product has the characteristics of a high-grade synthetic lubricant and excellent lubrication is accomplished by maintaining a film of this material between relatively moving bearing surfaces, or by maintaining a film comprised only in part of this new synthetic lubricant between relatively moving bearing surfaces. The remainder of the film may consist of another lubricant, a pour point depressant, an antioxidant, an extreme pressure lubricating improving ingredient, or any other addition agent or combination of addition agents that are commonly added to lubricating compositions.

The pour point, stability, and other characteristis of the synthetic lubricants prepared in accordance with this invention are susceptible to improvement in the same manner as are the same characteristics of ordinary petroleum base lubricating oils.

Further advantages and details of this invention will be apparent from a consideration of the following specific examples.

EXAMPLE I 326 grams (.65 mol) of oleone were mixed with 190 grams (1.3 mols) of n-octyl mercaptan in a 2-liter, 3-neck flask. The flask was equipped with a mechanical stirrer, thermometer, reflux condenser with a water "take-off" and a gas inlet tube. Anhydrous zinc chloride, 50 grams (10% of the total weight of the reactants) was added, and the reaction mixture was heated to 70° C., at which temperature the introduction of gaseous HCl was begun. The reaction mixture was heated at 150–157° C. for 1½ hours. During this time 10 cc. of water were collected in the water "take-off." After allowing the reaction mixture to cool to 100° C., 202 grams (1.3 mols) of n-octyl mercaptan were added, to react with the double bonds of the oleone, if this reaction should take place concurrently with the reaction illustrated above. The reaction mixture was allowed to stand overnight.

On the following day, the heating was continued, with the continuous introduction of gaseous HCl. The reaction temperature was held between 150–180° C. for 7 hours during which time an additional 6 cc. of water were collected. The heat was then shut off and a small amount of zinc dust added. The reaction mixture was allowed to cool to 130° C. and water was carefully added to hydrolyze the contents of the flask. The reaction mixture was then refluxed at 100–105° C. for two hours. The product was diluted with toluene to aid in washing and filtration and was then filtered by suction through a layer of filter clay. The filtered material was then washed 5–6 times with hot distilled water. After separation of the water, it was again filtered by suction through filter clay. The filtrate was filtered by gravity into a distilling flask and topped first by plant vacuum, then using the vacuum pump at 5–6 mm., to 200° C. pot temperature. The distillate from the vacuum pump distillation consisted of 153 grams of n-octyl mercaptan, which indicates that in this reaction, no addition of the mercaptan to the double bonds of the oleone takes place. The residue in the flask weighed 360 grams. The total amount of water recovered in the reaction was 16 grams. The theoretical recovery of water is 11.7 grams. The excess water was probably due to water in the reactants, especially the ZnCl₂ catalyst which is hygroscopic. The yield was 71.5% of the theoretical. There was some loss of material due to foaming during the vacuum distillation.

The product obtained was an oil with the following properties:

*Table I*

| | |
|---|---|
| Gravity, API | 26.7 |
| Pour, °F. | 10 |
| Kinematic viscosity at 100° F. | 115.2 |
| Kinematic viscosity at 210° F. | 15.73 |
| Viscosity index | 132 |
| Sulfur analysis, percent found | 7.2 |
| Mercaptol S, percent theory | 8.3 |

The pour point of this oleone reaction product is remarkably low when compared with oleone or its reaction products in general. For example, the reaction of oleone with tertiary butyl mercaptan without a catalyst results in a product with a pour point of 85° F. The viscosity index of the oil is high when judged by present mineral oil standards.

Since the viscosity of this oil is greater than the usual SAE grades of motor oil, the synthetic oil was blended with a light petroeum oil. The physical data obtained on these blends are shown in the following table:

*Table II*

| Blend or Oil | Pour, °F. | KV at 100° F. | KV at 210° F. | Viscosity Index |
|---|---|---|---|---|
| Light oil only | 20 | 27.68 | 4.89 | 111 |
| Light oil+5% Syn | 25 | 30.23 | 5.25 | 117 |
| Light oil+10% Syn | 20 | 32.31 | 5.53 | 119 |
| Light oil+25% Syn | 20 | 39.82 | 6.69 | 129 |
| Light oil+50% Syn | 20 | 56.80 | 8.95 | 133 |
| Synthetic only | 10 | 115.20 | 15.73 | 132 |

The response of the above blends and synthetic oil to a pour point depressant is shown in the following table. All of these blends and oils were treated with 0.375% of a commercial pour depressant of the alkylated phenol type.

*Table III*

| Blend or Oil | Pour Depressant, Conc. Per Cent | Pour, °F. | KV at 100° F. | KV at 210° F. | Viscosity index |
|---|---|---|---|---|---|
| Light oil only | 0.375 | −20 | 28.32 | 4.98 | 112 |
| Light oil+5% Syn | 0.375 | −15 | 30.95 | 5.29 | 114 |
| Light oil+10% Syn | 0.375 | −15 | 32.99 | 5.65 | 121 |
| Light oil+25% Syn | 0.375 | −20 | 40.46 | 6.69 | 127 |
| Light oil+50% Syn | 0.375 | −20 | 57.45 | 8.90 | 131 |
| Light oil+60% Syn | 0.375 | −20 | 68.33 | 10.18 | 131 |
| Synthetic only | 0.375 | −10 | 116.40 | 15.96 | 132 |

The oleone n-octyl mercaptan product was dewaxed by the usual method at −20° F. The dewaxed oil had the following properties:

*Table IV*

| | |
|---|---|
| Gravity, API | 26.3 |
| Pour, °F. | 5 |
| Kinematic viscosity at 100° F. | 120.3 |
| Kinematic viscosity at 210° F. | 16.25 |
| Viscosity index | 132 |
| Sulfur analysis, percent found | 6.9 |
| Sulfur mercaptol, percent theory | 8.3 |

In order to obtain the pour point response of the dewaxed synthetic oil 0.375% of the same pour depressant was blended with it. The physical properties of the resulting oil are shown in Table V, below:

*Table V*

| | |
|---|---|
| Gravity, API | 26.5 |
| Pour, °F. | −5 |
| Kinematic viscosity at 100° F. | 122.7 |
| Kinematic viscosity at 210° F. | 16.52 |
| Viscosity index | 131 |

Comparing the pour point of the above oil with that of the undewaxed oil, Table III, it will be seen that the undewaxed oil shows a better pour point response, thus no improvement in this property is to be gained by dewaxing this synthetic oil.

EXAMPLE II

Using n-dodecyl mercaptan and oleone with the same reaction conditions, a product was obtained which was an oil at slightly above room temperature but solidified when cooled to room temperature. See the following table for the physical and chemical properties of the product.

*Table VI*

| | |
|---|---|
| Gravity, API | 30.6 |
| Pour, °F. | 75 |
| Kinematic viscosity at 100° F. | 41.28 |
| Knematic viscosity at 210° F. | 7.67 |
| Viscosity index | 145 |
| Sulfur analysis, percent found | 7.13 |
| Sulfur (mercaptol), percent theory | 7.2 |

The above synthetic oils obtained by condensation of a mercaptan with oleone or blends of these oils with mineral oil were tested by a rotating cylinder oxidation test. This test is conducted in a reaction chamber consisting of a 9½" section of standard 5" iron pipe. Each end is closed with a flat steel plate, one end being equipped with a thermometer well and a $\frac{1}{16}$" inside diameter air vent. The cylinder is rotated about a horizontal axis at 20 R. P. M. so that the sample wets the entire curved surface. The cylinder is enclosed in an insulated box, and electrically heated. 25 cc. of the test oil is placed in the clean, sand-blasted cylinder. The vessel is started rotating with the heater adjusted to maintain the temperature in the reaction chamber at 300° F. After 72 hours the cylinder is allowed to cool to room temperature. The test oil is then removed from the apparatus and tested for kinematic viscosity at 100° F., kinematic viscosity at 210° F., neutralization number and A. S. T. M. naphtha insolubles. The surfaces of the cylinder are examined for abnormal sludge or lacquer deposits after the completion of each test. None of the oils or blends gave any abnormal sludge or lacquer deposits after completion of the tests. The results of this test are given in Table VII. If the blank mineral oil run is compared with any of the blends of this mineral oil with the synthetic oils, a pronounced improvement in the oxidation stability of the blended oils is apparent as shown by the lower NN, and percent naphtha insolubles, the small change in viscosity and viscosity index. The same comparison applies to the synthetic oils when tested alone.

*Table VII*

| Synthetic Oil or Blend | Before Rotating Cylinder Oxidation Test | | | | |
|---|---|---|---|---|---|
| | Gravity, API | Pour, °F. | Kinematic, 100° F. | Viscosity, 210° F. | V. I. |
| Blank Oil | | | 36.57 | 5.75 | 107.3 |
| Blank Oil+0.375% pour depressant | 32.8 | —20 | 28.32 | 4.98 | 112.0 |
| 5% Oleone-n octyl mercaptan product+0.375% pour depressant, in oil | 32.3 | —15 | 30.95 | 5.29 | 114.2 |
| 10% Oleone-n octyl mercaptan product+0.375% pour depressant, in oil | 32.2 | —15 | 32.99 | 5.65 | 121.2 |
| 25% Oleone-n octyl mercaptan product+0.375% pour depressant, in oil | 31.2 | —20 | 40.46 | 6.69 | 127 |
| 50% Oleone-n octyl mercaptan product+0.375% pour depressant, in oil | 29.7 | —20 | 57.45 | 8.90 | 130.7 |
| Oleone-n octyl mercaptan product dewaxed+0.375% pour depressant | 26.5 | —5 | 122.7 | 16.52 | 131.4 |
| Oleone-n octyl mercaptan product+0.375% pour depressant | 26.6 | —10 | 116.4 | 15.96 | 132.4 |
| 50% Oleone-n dodecyl mercaptan in oil | 31.3 | 65 | 34.8 | 6.24 | 134.8 |

| Synthetic Oil or Blend | After Rotating Cylinder Oxidation Test | | | | |
|---|---|---|---|---|---|
| | ASTM Naphtha | | Kin. Viscosity | | |
| | N.N. | Insol. Per Cent | 100° F. | 210° F. | V. I. |
| Blank Oil | 2.2 | 0.08 | 43.93 | 6.39 | 103.3 |
| Blank Oil+0.375% pour depressant | 3.4 | 1.60 | 68.1 | 6.47 | 14.3 |
| 5% Oleone-n octyl mercaptan product+0.375% pour depressant, in oil | 2.2 | 0.25 | 36.06 | 5.92 | 117.7 |
| 10% Oleone-n octyl mercaptan product+0.375% pour depressant, in oil | 2.2 | 0.27 | 39.38 | 6.42 | 122.2 |
| 25% Oleone-n octyl mercaptan product+0.375% pour depressant, in oil | 2.7 | 0.10 | 47.50 | 7.47 | 125.5 |
| 50% Oleone-n octyl mercaptan product+0.375% pour depressant, in oil | 2.7 | 0.16 | 71.28 | 10.34 | 128.4 |
| Oleone-n octyl mercaptan product dewaxed+0.375% pour depressant | 1.0 | 0.04 | 163.6 | 20.10 | 128.7 |
| Oleone-n octyl mercaptan product+0.375% pour depressant | 3.40 | 0.24 | 178.6 | 21.28 | 127.8 |
| 50% Oleone-n dodecyl mercaptan in oil | 2.00 | 0.24 | 40.12 | 6.88 | 133.4 |

The mercaptols described in this application are not corrosive to copper. Strips of brightly polished copper sheeting remained bright after 24 hours at 100° C. and after 3 hours at 150° C. The above tests are the usual laboratory tests for corrosive sulfur.

What is claimed is:

1. A process for reacting normal octyl mercaptan and oleone, which comprises contacting said mercaptan with said oleone, in the presence of between 5 per cent and 20 per cent, by weight of the total weight of the reactants, of anhydrous zinc chloride and of an excess of gaseous hydrochloric acid, at a temperature of between about 150° C. and about 180° C., and for a period of time of one to three hours.

2. The reaction product obtained by contacting normal octyl mercaptan with oleone, in the presence of between 5 per cent and 20 per cent, by weight of the total weight of the reactants, of anhydrous zinc chloride and of an excess of gaseous hydrochloric acid, at a temperature of between about 150° C. and about 180° C., and for a period of time of one to three hours.

3. A process for reacting normal octyl mercaptan with oleone, which comprises contacting said mercaptan with said oleone, in the presence of anhydrous zinc chloride and of an excess of gaseous hydrochloric acid, at an elevated temperature, and for a period of time sufficient to effect the reaction.

4. The reaction product obtained by contacting normal octyl mercaptan with oleone, in the presence of anhydrous zinc chloride and of an excess of gaseous hydrochloric acid, at an elevated temperature, and for a period of time sufficient to effect the reaction.

5. A process for reacting a normal mercaptan, containing from about six carbon atoms to about fourteen carbon atoms, inclusive, per molecule, with oleone, which comprises contacting said mercaptan with said oleone, in the presence of anhydrous zinc chloride and of an excess of gaseous hydrochloric acid, at an elevated temperature, and for a period of time sufficient to effect the reaction.

6. The reaction product obtained by contacting a normal mercaptan, containing from about six carbon atoms to about fourteen carbon atoms, inclusive, per molecule, with oleone, in the presence of anhydrous zinc chloride and of an excess of gaseous hydrochloric acid, at an elevated temperature, and for a period of time sufficient to effect the reaction.

7. A process for reacting normal octyl mercaptan with an aliphatic ketone containing an average of from about fourteen carbon atoms to about twenty carbon atoms, inclusive, in the aliphatic radicals, which comprises contacting said mercaptan with said ketone, in the presence of anhydrous zinc chloride and of an excess of gaseous hydrochloric acid, at an elevated temperature and for a period of time sufficient to effect the reaction.

8. The reaction product obtained by contacting normal octyl mercaptan with an aliphatic ketone containing an average of from about fourteen carbon atoms to about twenty carbon atoms, inclusive, in the aliphatic radicals, in the presence of anhydrous zinc chloride and of an excess of gaseous hydrochloric acid, at an elevated temperature, and for a period of time sufficient to effect the reaction.

9. A process for reacting a normal mercaptan, containing from about six carbon atoms to about fourteen carbon atoms, inclusive, per molecule, with an aliphatic ketone containing an average of from about fourteen carbon atoms to about twenty carbon atoms, inclusive, in the aliphatic radicals, which comprises contacting said mercaptan with said ketone, in the presence of anhydrous zinc chloride and of an excess of gaseous hydrochloric acid, at a temperature of between about 150° C. and about 180 C., and for a period of time sufficient to effect the reaction.

10. The reaction product obtained by contacting a normal mercaptan, containing from about six carbon atoms to about fourteen carbon atoms, inclusive, per molecule, with an aliphatic ketone containing an average of from about fourteen carbon atoms to about twenty carbon atoms, inclusive, in the aliphatic radicals, in the presence of anhydrous zinc chloride and of an excess of gaseous hydrochloric acid, at a temperature of between about 150 C. and about 180° C., and for a period of time sufficient to effect the reaction.

11. A process for reacting a normal mercaptan, containing from about six carbon atoms to about fourteen carbon atoms, inclusive, per molecule, with an aliphatic ketone containing an average of from about fourteen carbon atoms to about twenty carbon atoms, inclusive, in the aliphatic radicals, which comprises contacting said mercaptan with said ketone, in the presence of anhydrous zinc chloride and of an excess of gaseous hydrochloric acid, at an elevated temperature, and for a period of time sufficient to effect the reaction.

12. The reaction product obtained by reacting a normal mercaptan, containing from about six carbon atoms to about fourteen carbon atoms, inclusive, per molecule, with an aliphatic ketone containing an average of from about fourteen carbon atoms to about twenty carbon atoms, inclusive, in the aliphatic radicals, in the presence of anhydrous zinc chloride and of an excess of gaseous hydrochloric acid, at an elevated temperature, and for a period of time sufficient to effect the reaction.

FREDERICK C. FRANK.

REFERENCES CITED

The following references are of record in the file of this patent:

UNITED STATES PATENTS

| Number | Name | Date |
|---|---|---|
| 2,066,191 | Turner | Dec. 29, 1936 |
| 2,229,665 | Mochel | Jan. 28, 1941 |
| 2,322,093 | Moran et al. | June 15, 1943 |
| 2,369,612 | Schirm | Feb. 13, 1945 |

FOREIGN PATENTS

| Number | Country | Date |
|---|---|---|
| 544,651 | Great Britain | Apr. 22, 1942 |